United States Patent [19]

Kurita

[11] 4,446,020
[45] May 1, 1984

[54] FILTER PRESS

[75] Inventor: Tetsuya Kurita, Takarazuka, Japan

[73] Assignee: Kurita Machinery Manufacturing Company Limited, Osaka, Japan

[21] Appl. No.: 451,931

[22] Filed: Dec. 21, 1982

[30] Foreign Application Priority Data

Dec. 28, 1981 [JP] Japan ............... 56-195950[U]
Feb. 10, 1982 [JP] Japan ............... 57-19989
Feb. 17, 1982 [JP] Japan ............... 57-25081

[51] Int. Cl.$^3$ ............... B01D 25/34
[52] U.S. Cl. ............... 210/225; 100/112; 100/198; 210/236
[58] Field of Search ............... 210/225, 230, 236, 396, 210/397, 408; 100/112, 198

[56] References Cited

U.S. PATENT DOCUMENTS 2,974,802 3/1961 Morehouse et al. ............... 210/396
3,807,567 4/1974 Iwatani ............... 210/225
3,823,826 7/1974 Wieland et al. ............... 210/225
4,108,777 8/1978 Kurita et al. ............... 210/225

Primary Examiner—Benoit Castel
Assistant Examiner—Karen Hodson
Attorney, Agent, or Firm—Wenderoth, Lind & Ponack

[57] ABSTRACT

A filter press separates a raw liquid into a filtrate and a filter residue. The filter press includes a plurality of filter residue separating members each composed of a pair of confronting members between which a slit passage for passing a filter cloth is formed, and each provided between a pair of spaced support frames fixed to a lower portion of each filter plate, while a wedge-like edge portion is formed at the upper edge of one of the confronting members of the filter residue separating member for smoothly separating the filter residue from the filter cloth without any damage to the surface of the filter cloth.

2 Claims, 20 Drawing Figures

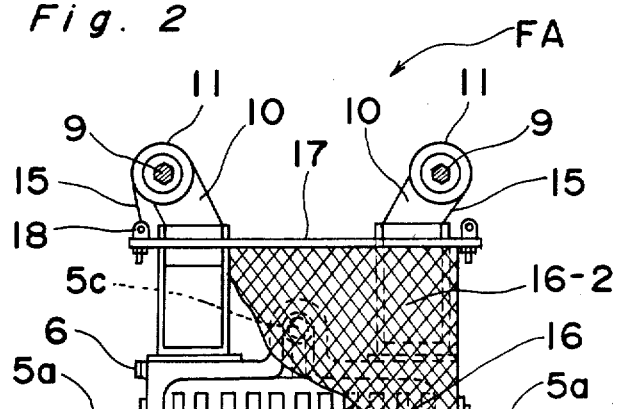
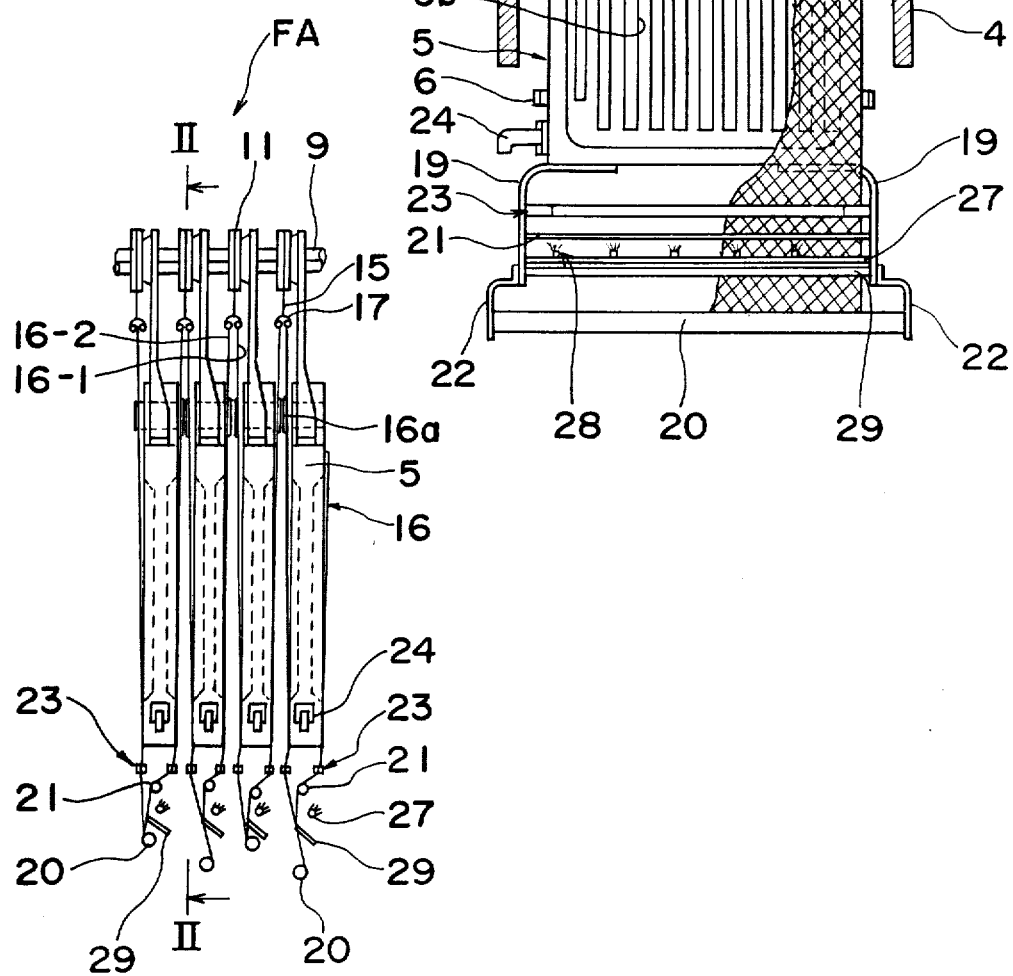

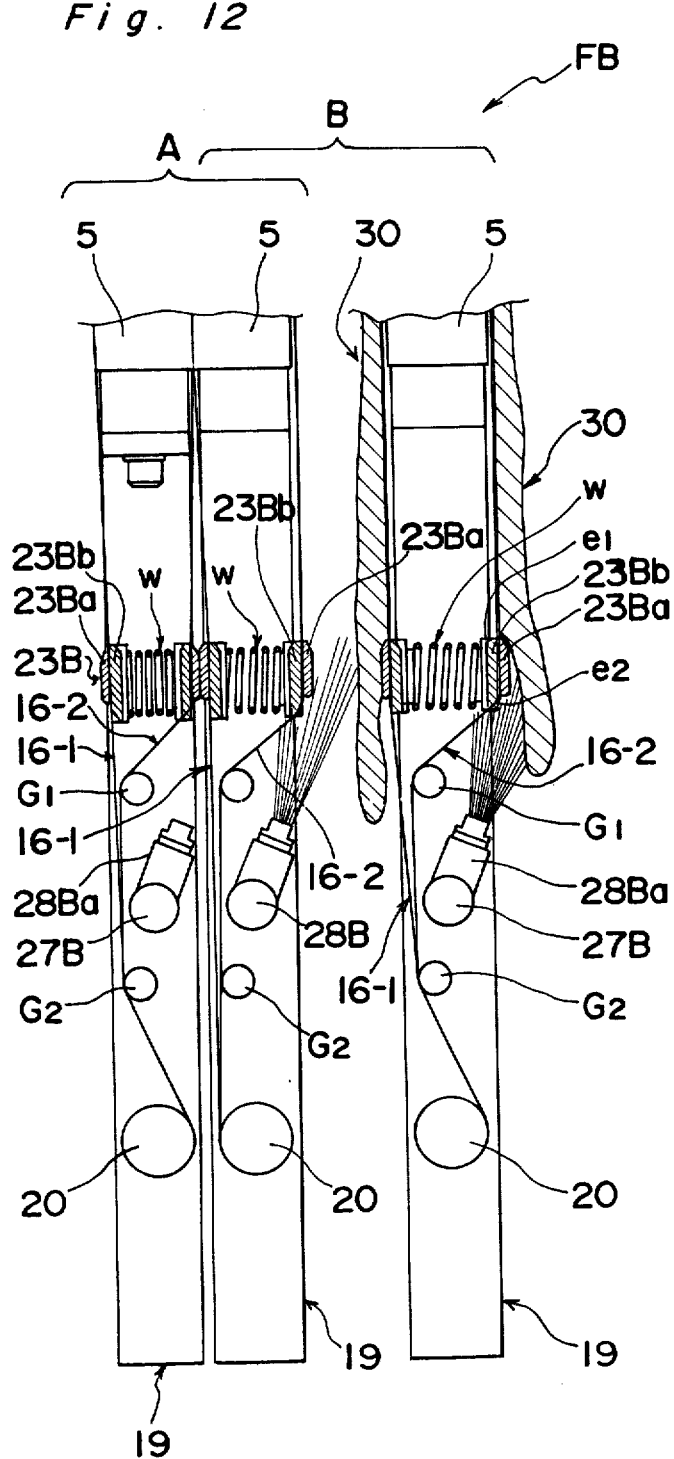
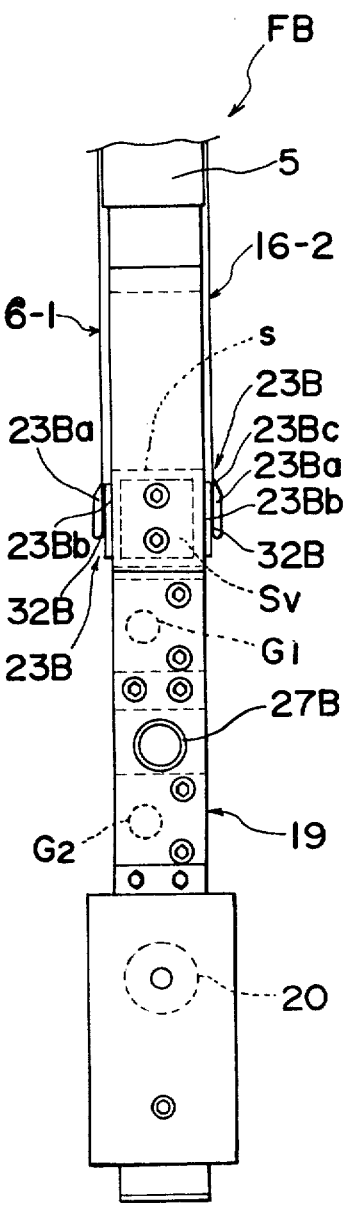
Fig. 12
Fig. 10

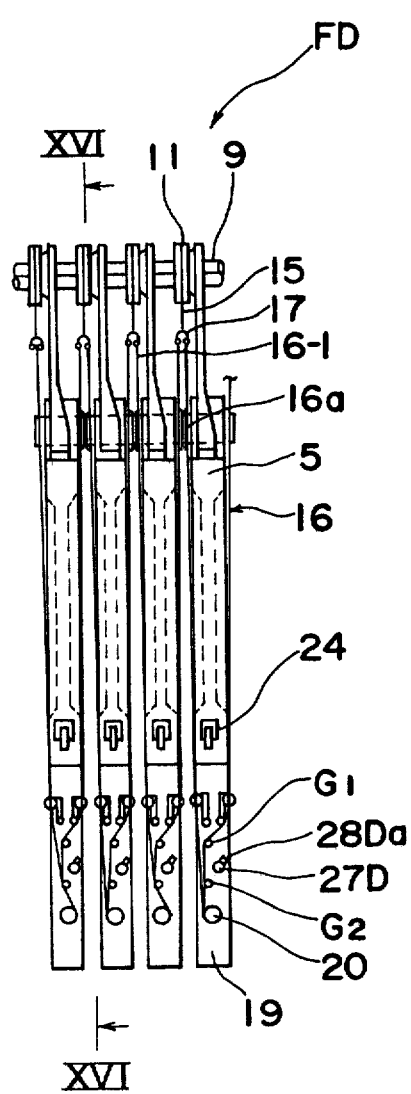
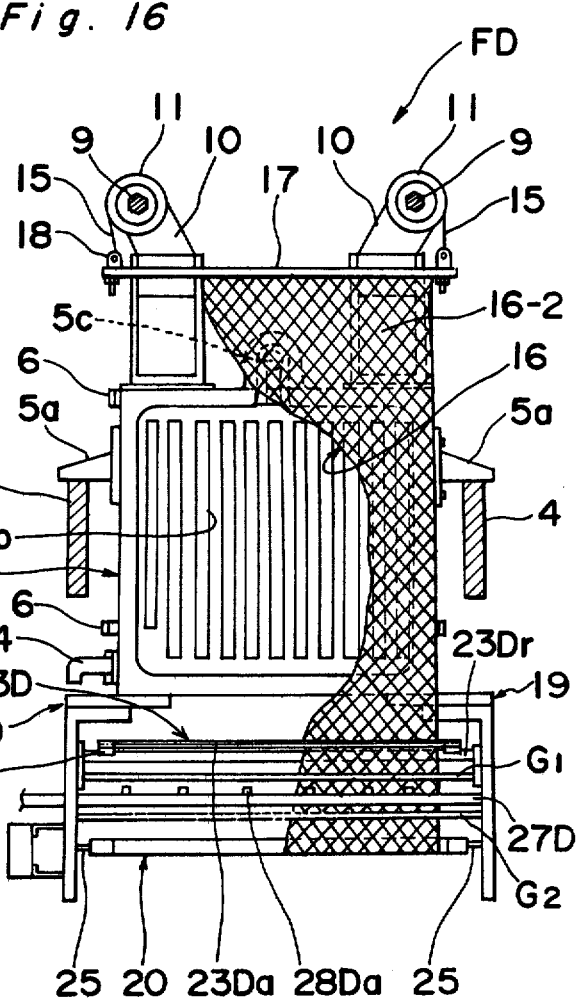
Fig. 16
Fig. 17

Fig. 19
Fig. 20
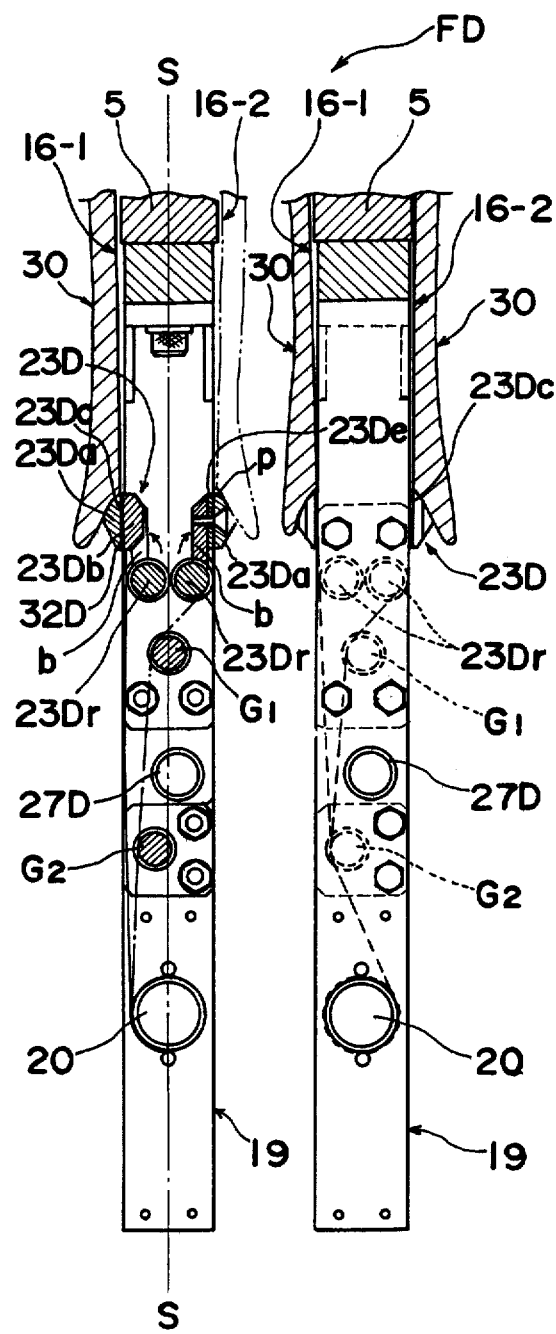
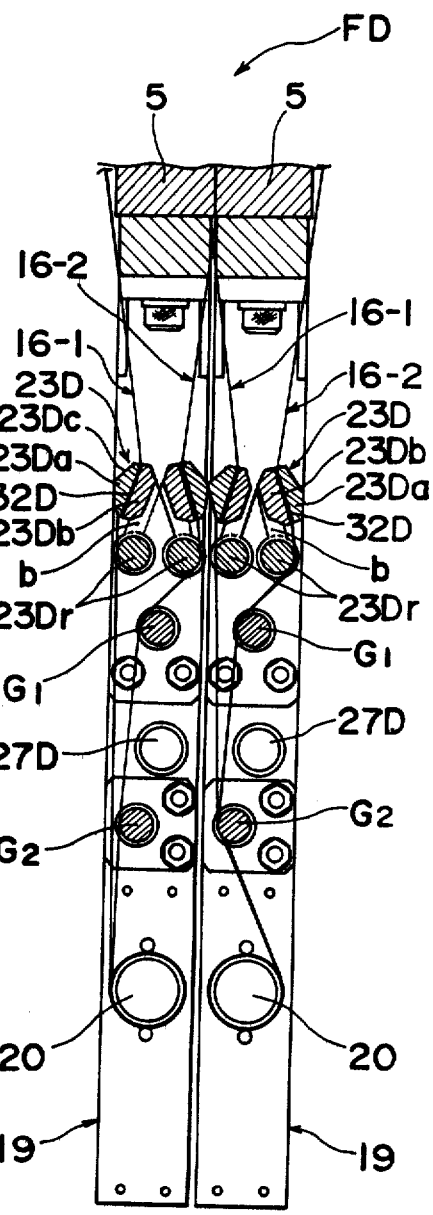

FILTER PRESS

BACKGROUND OF THE INVENTION

1. Field of the Invention

The present invention generally relates to a filter press arranged to separate a raw liquid to be processed, into a filtrate or filtered liquid and residue through filtering or press filtering thereof, and more particularly, to a filter press equipped with an improved residue separating arrangement for filter cloths used for respective filter plates or press filter plates of the filter press.

2. Description of the Prior Art

Conventionally, in a filter press of filter cloth travelling type, in order to collect filter residue adhering to a filter cloth via filtering of a raw liquid therethrough upon opening or spacing of filter plates for the filter press, there has been known an arrangement in which the filter residue as described above is adapted to be rubbed off the filter cloth by bringing a residue separating member such as a scraper or the like into contact with the surface of the filter cloth curved along a take-up roller for taking up the filter cloth or surface of a guide roller for guiding the filter cloth onto said take-up roller.

However, in the known arrangement as described above, in the case where the filter residue is scraped off the filter cloth by the scraper, etc., since the scraper is adapted to separate the residue while rubbing against the surface of the filter cloth between the residue adhering to the filter cloth and the filter cloth as said filter cloth is cause to travel, the surface of the filter cloth tends to be damaged by the scraper, thus resulting in a short life of the filter cloth.

SUMMARY OF THE INVENTION

Accordingly, an essential object of the present invention is to provide an improved filter press which is so arranged that a filter residue separating member constituted by a pair of plate-like members to define a slit passage for passing a filter cloth therethrough is provided between a pair of support frames fixedly disposed below each of the filter plates of the filter press, while a wedge-like edge portion is formed along an upper side of one of the plate-like members of the filter residue separating member so that the filter residue may be smoothly separated from the filter cloth without any damage to the surface of said filter cloth.

Another important object of the present invention is to provide a filter press of the above described type in which the slit passage formed between the plate-like members of each of the filter residue separating members is arranged to be positioned in or aligned with a travelling path of the filter cloth directed downwards generally in a vertical direction during opening of the filter plates, i.e. during travelling of said filter cloth so that any overload may not be applied to the filter cloth during its travelling for protecting the filter cloth against abrasion still positively so as to separate the residue adhering to the filter cloth in an efficient manner.

In accomplishing these and other objects, according to one preferred embodiment of the present invention, there is provided a filter press for separating raw liquid into a filtrate and filter residue, which includes a plurality of filter plates each having a pair of spaced support frames at the lower portion thereof and movably mounted between support stands for selective spacing therebetween or clamping together to each other, a pair of filter cloths disposed between each set of the neighboring filter plates, a winding up means arranged to be driven for forward or reverse rotation, cord members directed around said winding up means and respectively connected to upper edges of said filter cloths for selective lowering of said filter cloths into the space between the respective neighboring filter plates or for lifting said filter cloths therefrom, and a filter cloth take-up roller journalled between the spaced support frames of each of said filter plates and engaged with the lower edges of said filter cloths to be wound thereonto and to hold each of said filter plates therebetween. The filter cloth take-up roller is provided therein with a torsion spring arranged to urge the filter cloth take-up roller in a direction to wind up the filter cloths thereonto. The filter press further includes, a pair of filter residue separating members each having a slit passage for passing the filter cloths therethrough so as to separate the filter residue adhering to said filter cloths and provided between the spaced support frames of each of said filter plates.

By the arrangement according to the present invention as described above, an improved filter press efficient in operation has been advantageously presented through simple construction, with substantial elimination of disadvantages inherent in the conventional filter presses of this kind.

BRIEF DESCRIPTION OF THE DRAWINGS

These and other objects and features of the present invention will become apparent from the following description taken in conjunction with the preferred embodiment thereof with reference to the accompanying drawings, in which:

FIG. 2 is a cross section taken along the line II—II in FIG. 3 showing a rear side view of the filter press of FIG. 1, FIG. 3 is a fragmentary front elevational view of an essential portion of the filter press of FIG. 1, particularly showing the filter plates in an opened or spaced state, FIG. 10 is a fragmentary front elevational view showing, on an enlarged scale, an essential portion in FIG. 8, FIG. 12 is a fragmentary cross sectional view showing, on an enlarged scale, the filter plates employed in the filter press of FIG. 6 in a closed or clamped state (represented by A in FIG. 12) and in an opened state (represented by B in FIG. 12), FIG. 16 is a cross section taken along the line XVI—XVI in FIG. 17 showing a rear side view of the filter press of FIG. 15, FIG. 17 is a fragmentary front elevational view of an essential portion of the filter press of FIG. 15, particularly showing the filter plates in an opened state, FIG. 19 is a fragmentary cross sectional view showing, on an enlarged scale, an essential portion in the arrangement of FIG. 17 (in the filter plate at the left side in FIG. 19, the cross section taken along the line XIX—XIX in FIG. 18 is shown at the right side of a line S—S, while the cross section taken along the line XIX'—XIX' in FIG. 18 is shown at the left side of the line S—S), and FIG. 20 is a fragmentary cross sectional view showing the filter plates of the filter press of FIG. 15 in the closed or clamped state.

DETAILED DESCRIPTION OF THE PREFERRED EMBODIMENT

Figure 1:
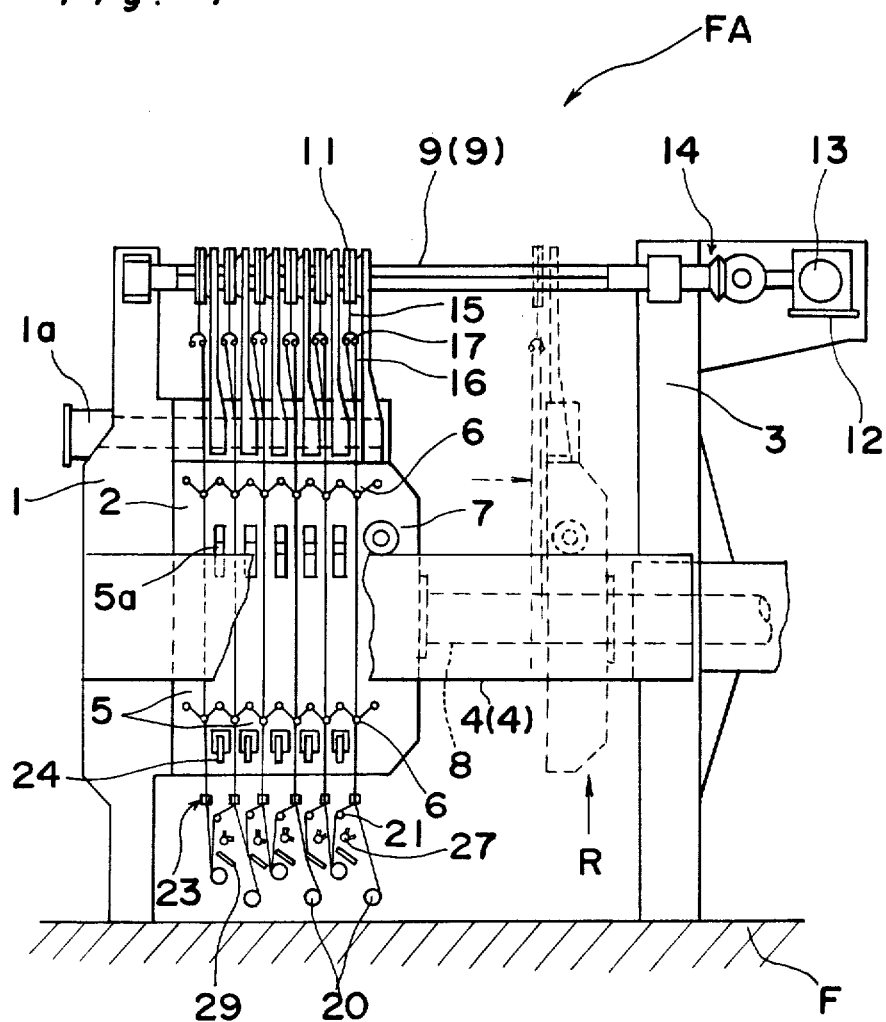
FIG. 1 is a schematic front elevational view of a filter press according to one preferred embodiment of the present invention.

Before the description of the present invention proceeds, it is to be noted that like parts are designated by like reference numerals throughout the accompanying drawings.

Referring now to the drawings, there is shown in FIGS. 1 and 2, a filter press FA according to one preferred embodiment of the present invention. The filter press FA generally includes a front stand 1 for supporting a carrier plate 2, and a rear stand 3, which are mounted on a suitable base F in a spaced relation from each other, side beams 4 respectively provided at opposite sides of the front and rear stands 1 and 3, a plurality of filter plates 5 connected to each other by connecting links 6 provided at opposite sides thereof and slidably supported on upper edges of the side beams 4 through a pair of protrusions 5a formed on opposite sides of each of the filter plates 5 for movement in a lateral direction in FIG. 1, and a movable plate 7 arranged to be driven by a driving piston 8 of a hydraulic means or the like (not shown) supported by the rear stand 3 for reciprocation in the lateral direction, so that, upon retraction of said movable plate 7 back to a position R shown by dotted lines, the respective filter plates 5 are opened or spaced from each other at predetermined intervals set by the connecting links 6.

The filter press FA of FIG. 1 further includes a pair of driving shafts 9 each having a polygonal cross section and suitably journalled in upper opposite sides of the front and rear stands 1 and 3 so as to be driven in a forward and a reverse direction for rotation by a motor 13 having a reduction unit mounted on a fixing base 12 provided at the upper portion of the rear stand 3, through a bevel gear transmission mechanism 14. As shown in FIG. 2, the driving shafts 9 are respectively fitted in corresponding pairs of winding up or take-up pulleys 11 rotatably supported at upper opposite sides of the filter plates 5 through support members 10 secured to the upper portions of said filter plates 5. Around each of the winding up pulleys 11, a hanger cord 15 is directed, with one end of the hanger cord 15 being connected to the pulley 11, while the other end of the cord 15 is connected to a connecting piece 18 fixed to each end portion of a hanging rod 17 for suspending a filter cloth 16 therefrom.

On the under surface of a frame for the filter plate 5, a pair of support metal pieces or frames 19 is provided to extend downwardly therefrom, while at the lower portions of said support pieces 19, another pair of auxiliary support metal pieces 22 is provided to rotatably hold a filter cloth take-up roller 20 therebetween.

As shown in FIG. 1 and FIG. 3, lower edge portions of two pieces of filter cloth 16-1 and 16-2, which respectively cover the front and rear filter faces 5b at opposite faces of the filter plate 5, are adapted to be fixedly engaged with the take-up roller 20.

Figure 4:
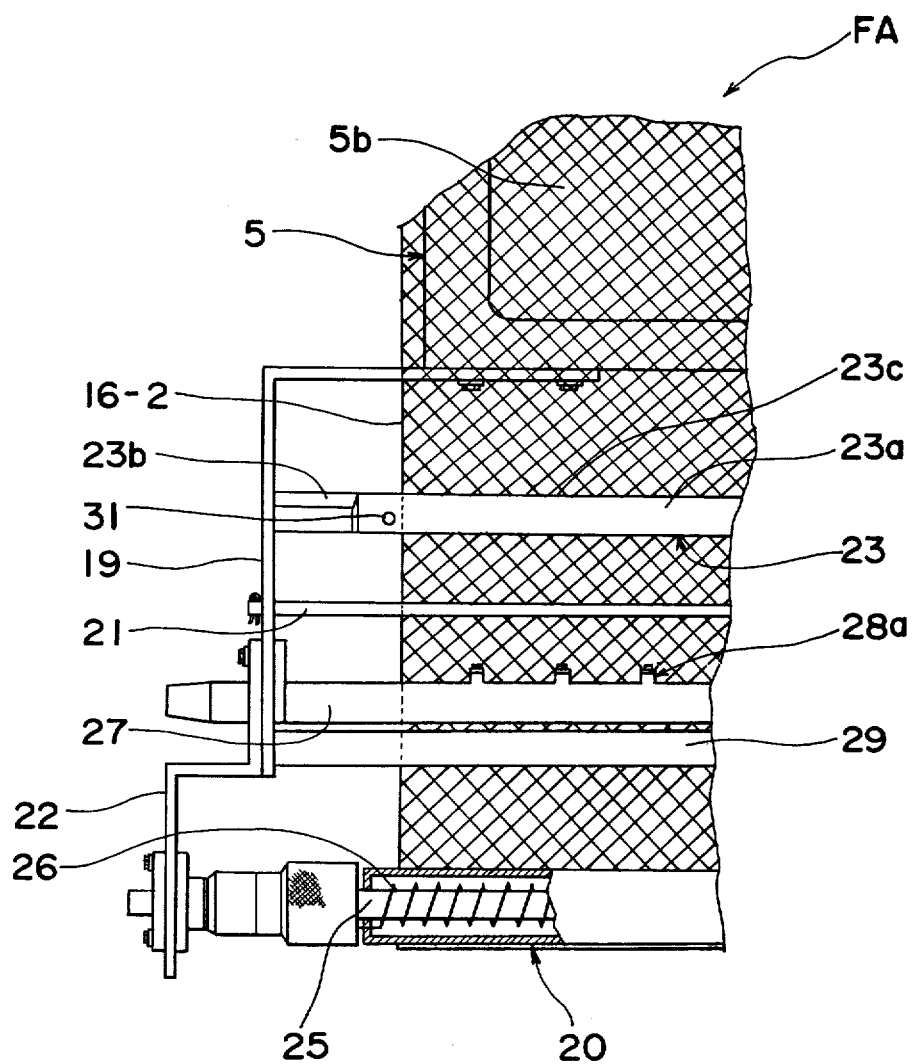
FIG. 4 is a fragmentary rear side view showing, on an enlarged scale, an essential portion in FIG. 2.

As is most clearly seen in FIG. 4, the take-up roller 20 is composed of a cylindrical hollow roller, which is rotatably supported at its opposite ends through bearings by a support shaft 25 secured between the support metal pieces 19. Within the take-up roller 20, there is provided a coil-shaped torsion spring 26 whose opposite ends are engaged with said take-up roller 20, and the torsion spring 26 is wound around the support shaft 25, with the central portion of said spring 26 being secured to the support shaft 25, so that the take-up roller 20 is normally urged by the spring force of the torsion spring 26 in a rotating direction along which the filter cloths 16-1 and 16-2 are wound.

Meanwhile, at the upper portion of the pair of support metal pieces 19 described earlier, there is mounted a filtering residue separating member 23 composed of a pair of plate-like members, i.e. an outer plate 23a and inner plate 23b.

Figure 5:
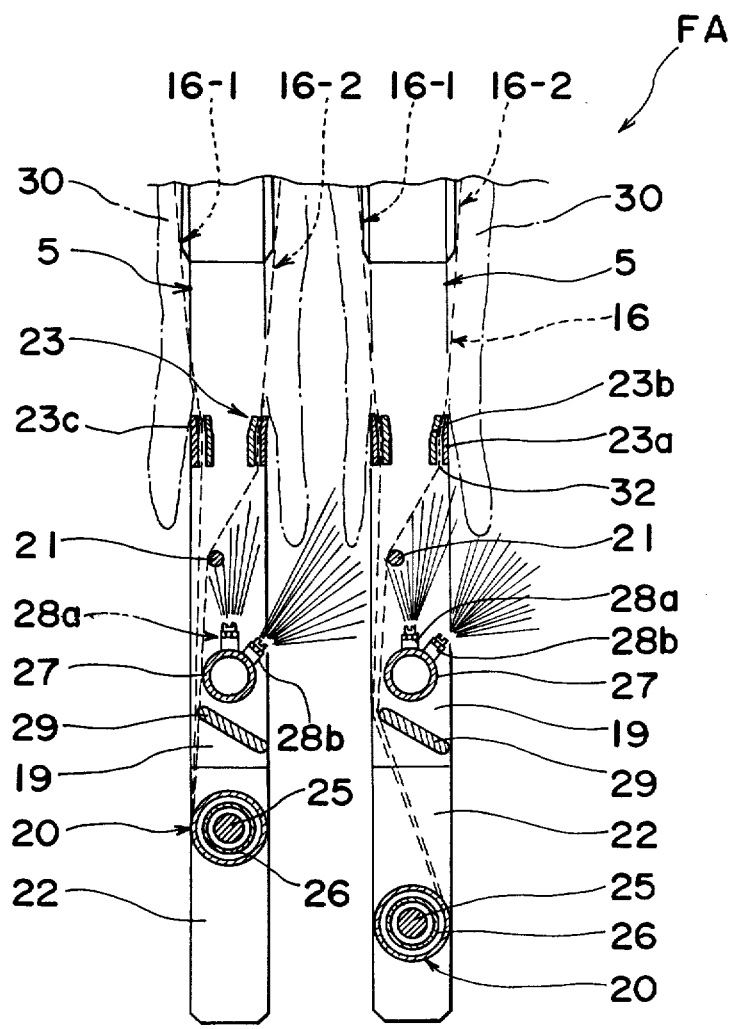
FIG. 5 is a fragmentary cross sectional view showing, on an enlarged scale, detailed constructions in the arrangement of FIG. 3.
Figure 6:
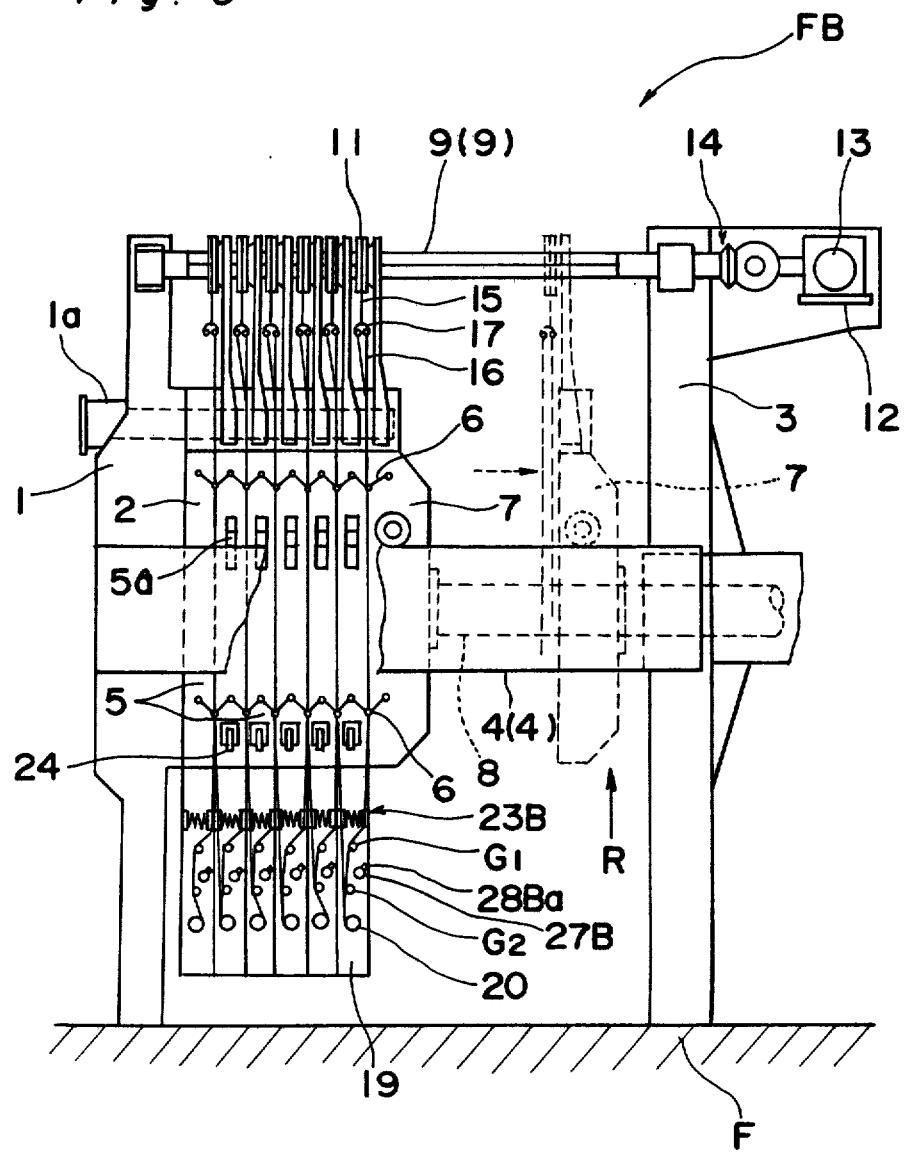
FIG. 6 is a view similar to FIG. 1, which particularly shows a modification thereof.
Figure 7:
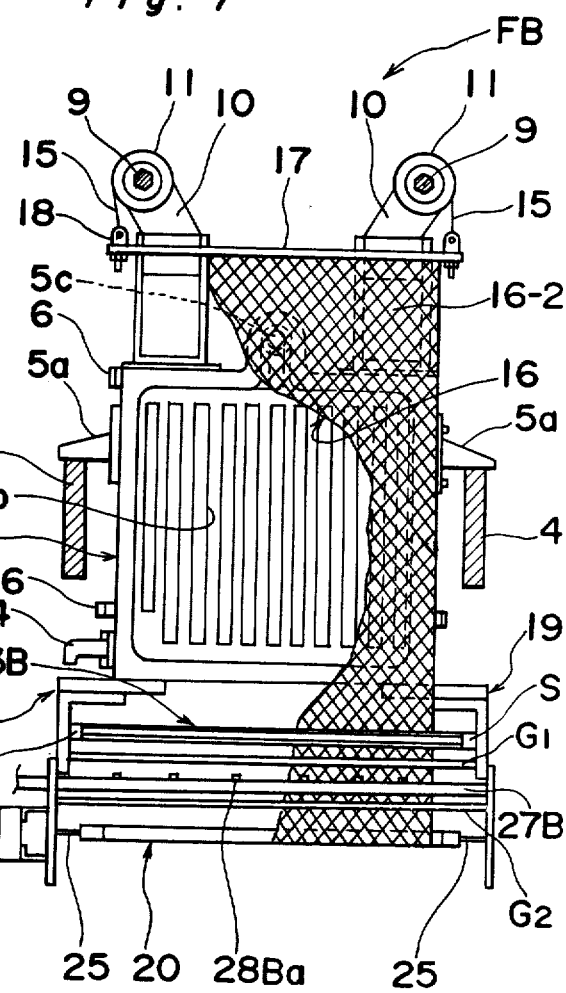
FIG. 7 is a cross section taken along the line VII—VII in FIG. 8 showing a rear side view of the filter press of FIG. 6.
Figure 8:
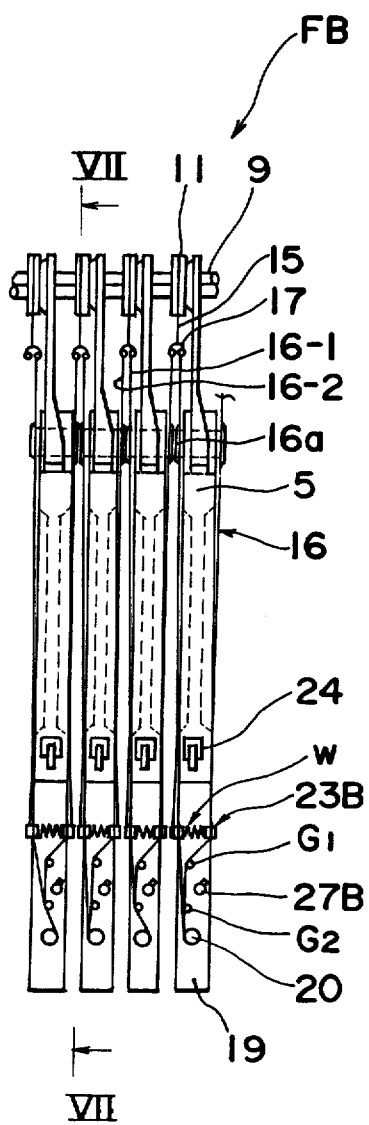
FIG. 8 is a fragmentary front elevational view of an essential portion of the filter press of FIG. 6, particularly showing the filter plates in an opened state.
Figure 9:
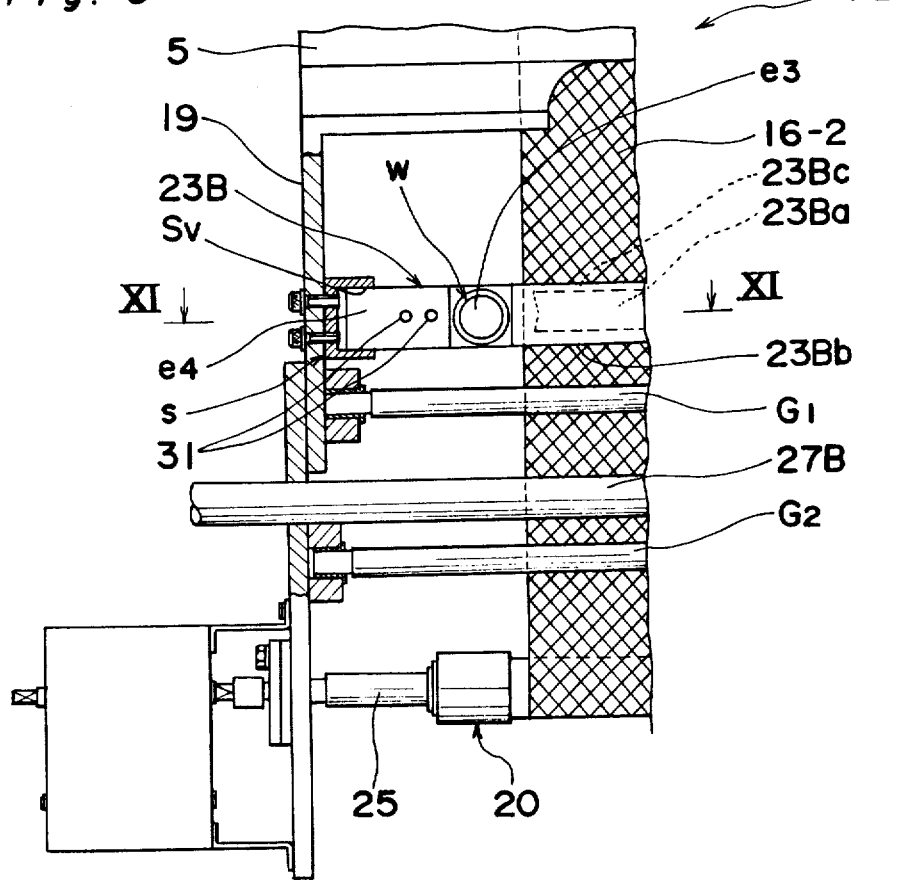
FIG. 9 is a fragmentary rear side view showing, on an enlarged scale, an essential portion in FIG. 7.

The inner plate 23b is bent, at its upper portion, externally away from the filter plate 5 and is secured, at its opposite ends, to the support metal pieces 19. As shown in FIG. 5, the outer plate 23a has a wedge-shaped edge portion 23c formed at its upper edge and is longer in length than a width of the filter cloth 16. The outer plate 23a is detachably mounted, by bolts 31, on the outer side of the inner plate 23b, with a slit having a width approximately equal to the thickness of the filter cloth 16 being provided therebetween, and thus, a bent slit passage 32 is formed between the outer plate 23a and the inner plate 23b to allow the filter cloth 16 to pass therethrough. Accordingly, during downward running of each filter cloth 16, the edge portion 23c of the outer plate 23a of the filter residue separating member 23 cuts between the filter cloth 16 and the filter residue 30 adhering to the filter cloth 16, and therefore, the filter cloth 16 alone is caused to pass through said slit passage 32, with each face thereof being in sliding contact with the respective plates 23a and 23b, while the filter residue 30 is being separated from the filter cloth 16 due to the wedge effect caused by the edge portion 23c, and thus, the travelling path of the filter cloth 16 is adapted to be directed inwards.

Moreover, before the filter plate 5 and between the support metal pieces 19, in a position below the filter residue separating members 23, there are fixed shifting rods 21 with washing pipes 27 being provided under the shifting rods 21. Each of the washing pipes 27 is provided, on its surface, with a large number of first nozzles 28a directed vertically upwards, and second nozzles 28b directed slantwise upwardly and projecting rearwardly. The filter cloth 16-2 at the rear side of the filter plate 5, the filter residue 30 of which has been separated by its passing through the slit passage 32 of the filter residue separating member 23, is further altered in its travelling path towards the front side of the filter plate 5 so that the filter cloth surface can be washed with washing water jetted from the first nozzles 28a. On the other hand, the second nozzles 28b are adapted to wash the surface of the filter cloth 16-1 on the front side of the rearwardly located filter plate 5. Furthermore, water guard plates 29 are provided below the washing pipes 27 to protect the filter cloths 16 wound on the filter cloth take-up rollers 20 against splashes of dirty water with which the filter cloth have been washed.

By the above arrangement, as shown in solid lines in FIG. 1, in a state where the filter plates 5 have been simultaneously clamped together to the side of the front stand 1 by the advance of the movable plate 7, raw liquid, which has been poured under pressure between the filter cloths 16 through a raw liquid supply port 5c provided on each of the filter plates 5 (FIG. 2) and a raw liquid supply fitting 16a attached to each of the filter cloths 16, from a raw liquid supply pipe 1a supported on the front stand 1 is separated into the filter residue and the filtered liquid, with the filtered liquid being further collected through a filtered liquid collecting pipe 24 provided at the lower side portion of each of the filter plates 5.

Upon retreat of the movable plate 7 back to the position R in FIG. 1 after completion of one filtering process, the filter plates 5 which are successively coupled with each other from the side of the movable plate 7 by the connecting links 6 are simultaneously opened or spaced from each other at predetermined intervals as shown in FIG. 3. Simultaneously with the opening or spacing of the filter plates 5 as described above, part of the separated filter residue 30 falls downwards by gravity because as it is in a configuration of a cake. At a stage where some portion of the filter residue 30 has been dropped, the filter cloth 16 is kept spread so as to be slightly away from the filter plate 5. In this stage when the hanger cords 15 passed around the winding up pulleys 11 are rotated for rewinding via the right and left driving shafts 9 by driving the motor 13 in a rewinding direction through speed reduction of the motor 13, the torsion spring 26 in a fully twisted state causes the take-up roller 20 to rotate in a winding direction by its strong spring force.

The filter cloths 16-1 and 16-2 located at opposite faces of the respective filter plates 5 are passed through the corresponding filter residue separating members 23 by the winding rotation of the take-up roller 20 arising from the spring force of the spring 26, thereby to separate the filter residue 30 remaining on the filter cloths 16-1 and 16-2 therefrom. The filter cloth 16-1 at the front side of the filter plate 5 whose filter residue 30 has been separated, is wound onto the take-up roller 20, while being changed in its running path somewhat inwardly by the water guard plate 29. On the other hand, the filter cloth 16-2 at the rear side of the filter plate 5 whose filter residue 30 has been separated is altered in its running passage, towards the front side by the shift rod 21, and thereafter, is wound, together with the filter cloth 16-1, onto the take-up roller 20. It is to be noted here that washing of each of the filter cloths 16 by water from the washing pipe 27 is properly effected during the filter cloth winding or filter cloth rewinding.

As is seen from the foregoing description, in the filter press according to the present invention, it is so arranged that the filter residue separating member composed of the pair of plate-like members having the slit passage formed therebetween for changing the travelling path of the filter cloth inwardly by passing said filter cloth therethrough, is provided between the pair of support metal pieces or frames provided below each of the filter plates, while the wedge-like edge portion is formed at the upper edge of one of the plate-like members of the filter residue separating member for contact with the front surface of said filter cloth, and therefore, during downward travelling of the filter cloth, it is possible to cause only the filter cloth to pass through the slit passage of said filter residue separating member, with the filter residue adhering to the filter cloth being smoothly separated from the filter cloth by said wedge-like edge portion at the entrance of said slit passage, while any damage to the filter cloth during separation of the filter residue therefrom may be positively prevented. Moreover, since the filter cloth can be guided by the slit passage, guide rollers or the like for the filter cloth may be dispensed with, thus resulting in a simplification in the structure at the lower portion of the filter plates.

Referring to FIGS. 6 to 12, there is shown a modification of the filter press FA of FIGS. 1 to 5. The modified filter press FB of FIGS. 6 to 12 is intended to further prevent the abrasion of the filter cloths by causing the slit passages of the filter residue separating members to locate along the downward travelling path of the filter cloths generally in the vertical direction, during opening of the filter plates, i.e. during travelling of the filter cloths, and is so arranged that the filter residue separating members are provided in pair to confront each other in positions above the filter cloth take-up roller supported between the pair of support metal pieces provided below the filter plates, with a spring expansible and contractible back and forth with respect to the filter plates being disposed between said filter residue separating members, whereby upon opening or spacing of said filter plates, the slit passages of the filter residue separating members are aligned with the downward travelling path of the filter cloths generally in the vertical direction, while upon closing or clamping together of the filter plates, the filter residue separating members are accommodated within the thickness of the filter plate through contraction of the spring.

In the modified filter press FB of FIGS. 6 to 12, the filter residue separating members 23B each formed by the outer plate 23Ba and the inner plate 23Bb to define a slit passage 32B therebetween are provided in pair at the upper portion of the support metal pieces 19 through support members S.

The outer plate 23Ba is made of a thin plate longer in length than the width of the filter cloth 16, and is formed, at its upper edge, with a residue separating edge 23Bc which is inclined slantwise from the inner side towards the outer side with respect to the filter plate 5.

Figure 11:
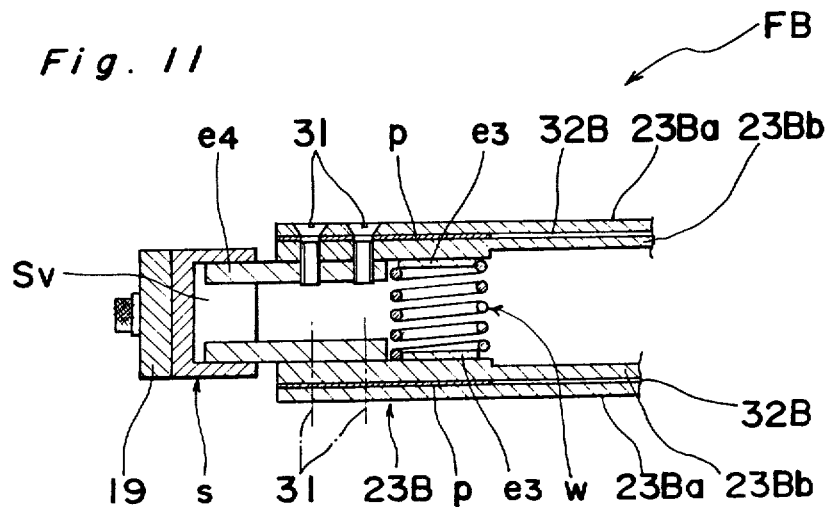
FIG. 11 is a fragmentary cross section taken along the line XI—XI in FIG. 9.

Meanwhile, the inner plate 23Bb is formed by a thin plate having the length approximately equal to that of the outer plate 23Ba, and as shown in FIG. 11, the outer plate 23Ba is secured to the inner plate 23Bb by the bolts 31, through thin plates P having approximately the same thickness as that of the filter cloth 16 and disposed on the outer surface at opposite ends of the inner plate 23B*b* so as to define the slit passage 32B between the outer plate 23B*a* and the inner plate 23B*b* for passing the filter cloth 16 therethrough.

Moreover, as shown in FIG. 12, the inner plate 23B*b* is formed, at its upper and lower edges except for the opposite ends thereof, with an upper edge portion e1 and a lower edge portion e2 for the filter cloth, which are respectively inclined from the outer side towards the inner side with respect to the filter plate 5, while, at said opposite end portions of each inner plate 23B*b*, disc-like protrusions e3 for receiving springs W thereon and engaging portions e4 axially extending from the opposite ends of the inner plate 23B*b* in a stepped manner are provided.

Each of the support members S fixed, at its outer face, to the inner side of the support metal piece 19, is formed, at its inner face side, with a recess SV for movably receiving the above engaging portion e4 of the inner plate 23B*b* in a back and forth direction of the filter plate 5.

Accordingly, the pair of the filter residue separating members 23B are disposed between the pair of supporting metal pieces 19 so that the inner plates 23B*b* thereof confront each other, with the spring W being fitted between the disc-like protrusions e3, and with the respective engaging portions e4 of the inner plate 23B*b* being received in the corresponding recesses SV of the support members S (FIG. 11). Thus, as shown at B in FIG. 12, upon opening or spacing of the filter plates 5, the respective engaging portions e4 as described above are brought into contact with the inner faces of the recesses SV of the support members S by the spring force of the springs W so as to position the slit passages 32B of the filter residue separating members 23B along the downward travelling path directed generally in the vertical direction for smooth running of the filter cloth 16, without any damage to the surface of the filter cloth 16 by the edge portions 23B*c* and e1 of the outer and inner plates 23B*a* and 23B*b* of the filter residue separating member 23B. Accordingly, during downward running of each filter cloth 16, the edge portion 23B*c* of the outer plate 23B*a* of the filter residue separating member 23B cuts between the filter cloth 16 and the filter residue 30 adhering to the filter cloth 16 and therefore, the filter cloth 16 alone is caused to pass through said slit passage 32B with each face thereof being in sliding contact with the respective plates 23B*a* and 23B*b*, while the filter residue 30 is being separated from the filter cloth 16 due to the wedge effect caused by the edge portion 23B*c*. On the other hand, as shown at A in FIG. 12, during closing or clamping together of the filter plates 5, the outer plates 23B*a* are pushed against each other for compressing the springs W within the thickness of the filter plate 5 so that there is no inconvenience for the clamping of the filter plates 5.

Furthermore, between the filter residue separating members 23B and the filter cloth take-up roller 20 supported by the support metal pieces 19, there are further journalled first and second guide rollers G1 and G2 for guiding the filter cloths 16 before and after each filter plate 5, while at the back of the filter plate 5 in a position between the guide rollers G1 and G2, the water washing pipe 27B having a large number of nozzles 28B*a* upwardly extending slantwise rearwardly from said pipe 27B is provided for washing the filter cloth 16.

In the filtering operation to be effected generally in the similar manner as described with reference to FIGS. 1 to 5, the filter cloth 16-1 which is located at the front side of the filter plate 5, and from which the filter residue 30 has been separated, is wound onto the filter cloth take up roller 20 after being bent to a certain extent towards the rear side of the filter plate 5 by the second guide roller G2. Meanwhile, the filter cloth 16-2 located at the back of the filter plate 5 is also wound onto the filter cloth take up roller 20, through said first and second guide rollers G1 and G2, after sliding contact thereof with the lower edge portion e2 of the inner plate 23B*b* of the filter residue separating member 23B.

In the modified filter press FB as described so far, since the slit passage 32B is formed by disposing the thin plates P between the outer plate 23B*a* and the inner plate 23B*b* of each of the filter residue separating members 23B, the width of the slit passage 32B may be readily altered by changing the thickness of the thin plates P for application to various filter cloths, in addition to the effects available from the first embodiment of FIGS. 1 to 5.

Figure 13:
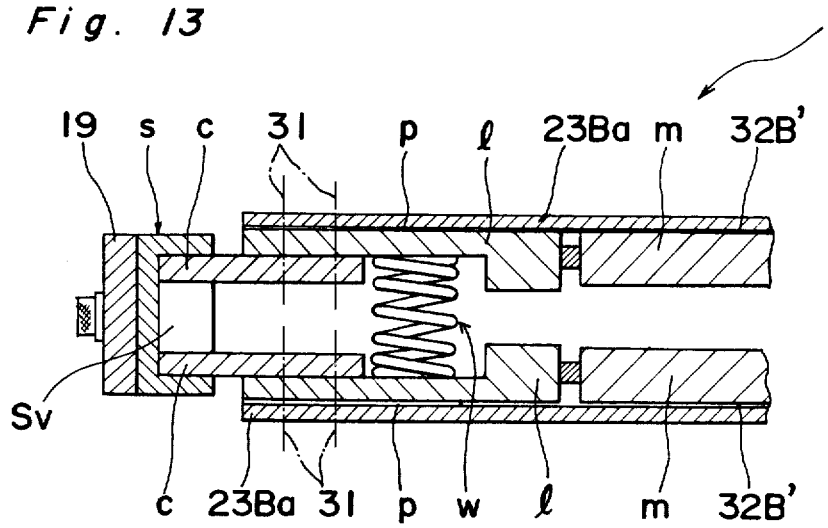
FIG. 13 is fragmentary cross sectional view showing a modification of a residue separating member of FIG. 11.
Figure 14:
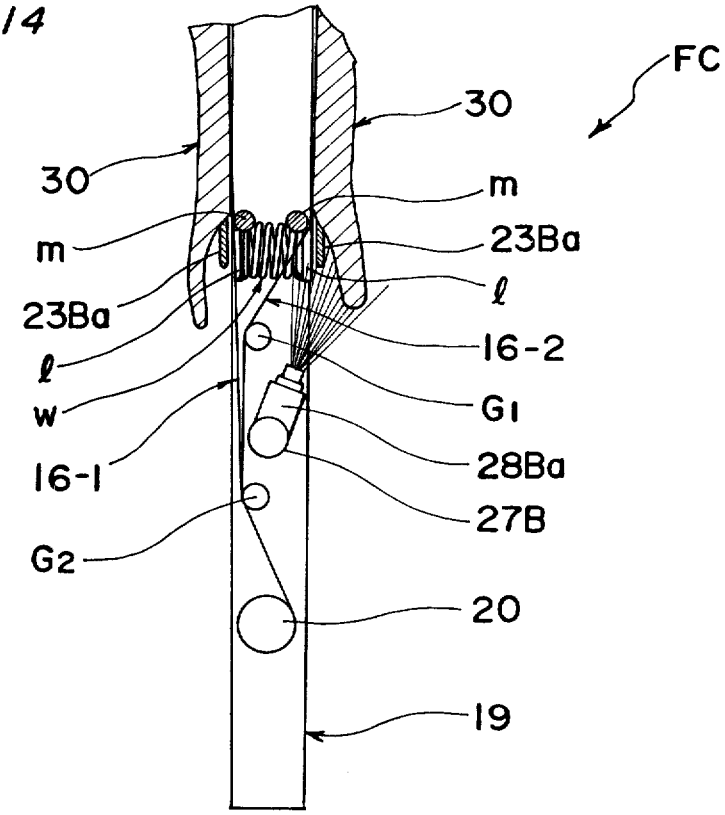
FIG. 14 is a fragmentary cross sectional view showing, on an enlarged scale, an essential portion of a filter press employing the modified filter residue separating member of FIG. 13.
Figure 15:
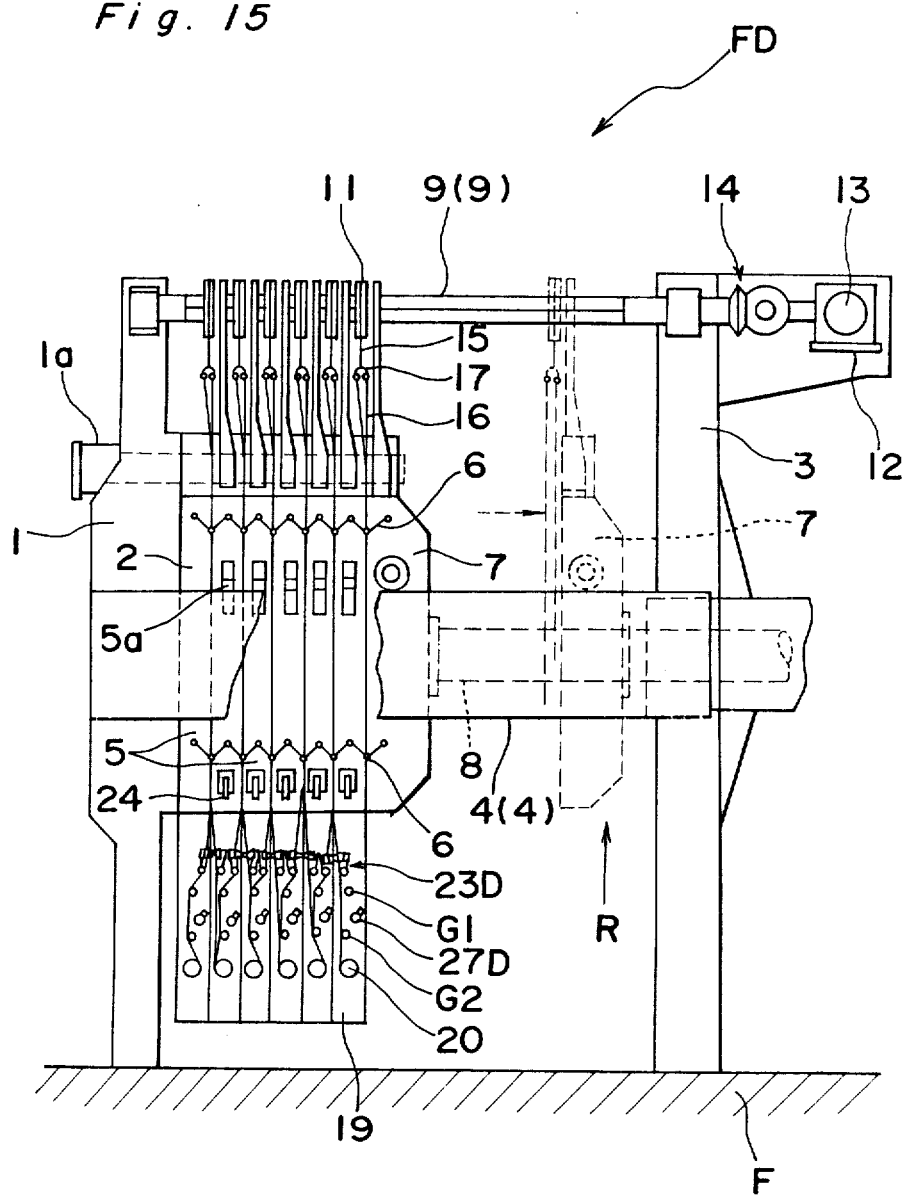
FIG. 15 is a view similar to FIG. 6, which particularly shows a further modification thereof.
Figure 18:
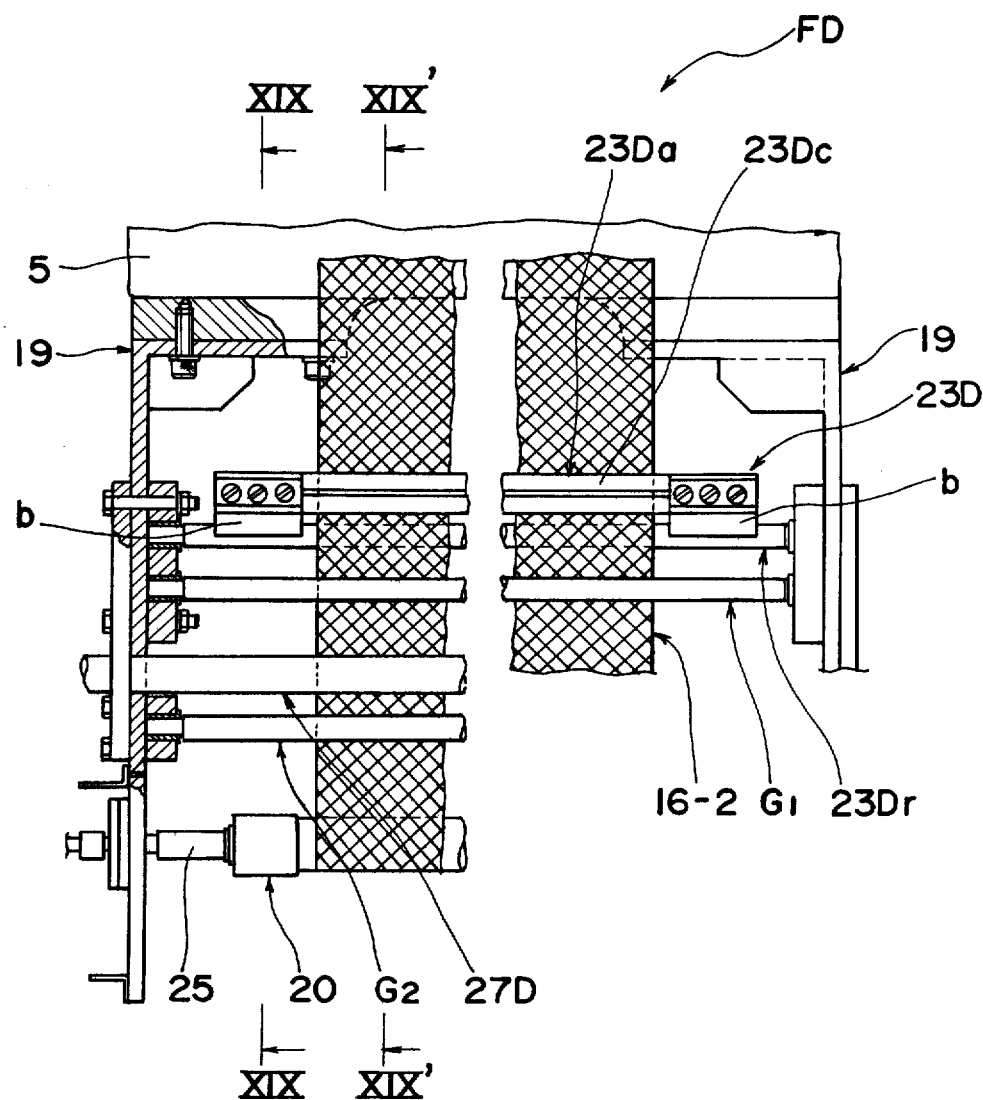
FIG. 18 is a fragmentary rear side view showing on an enlarged scale, an essential portion in FIG. 16.

The filter press FB described so far may further be modified in various other ways, for example, as in the filter press FC shown in FIGS. 13 and 14. In the modified filter press FC, each of the inner plates 23B*b* described as employed in the arrangement of FIGS. 6 to 12, is replaced by a roller m so as to define a slit passage 32B' between said roller m and the outer plate 23B*a*. More specifically, the opposite ends of each of the rollers m are journalled in L-shaped auxiliary members l, while a disc-shaped protrusion (not particularly shown) is formed at the inner surface of each of said auxiliary members l for receiving the spring W, with engaging portions C similar to the engaging portions e4 being provided at the end portions of the auxiliary members l for engagement with the recesses SV of the support members S so that the filter residue separating members 23B' each including the outer plate 23B*a* and the roller m are movable in the back and forth directions with respect to the filter plates 5. By the above arrangement, the travelling of the filter cloth 16 within the slit passage 32B' can be more smoothly effected through guiding by the roller m.

Since other constructions end effects of the filter presses FB and FC of FIGS. 6 to 14 are generally similar to those of the filter press FA in FIGS. 1 to 5, detailed description thereof is abbreviated for brevity, with like parts being designated by like reference numerals and symbols.

As is seen from the foregoing description, in the modified filter presses FB and FC of FIGS. 6 to 14, the filter residue separating members are provided in pair to confront each other in positions above the filter cloth take-up roller supported between the pair of support metal pieces provided below the filter plates, with the spring expansible and contractible back and forth with respect to the filter plates being disposed between said filter residue separating members so that upon opening or spacing of said filter plates, the slit passages of the filter residue separating members are aligned with the downward travelling path of the filter cloths generally in the vertical direction, while upon closing or clamping of the filter plates, the filter residue separating members are accommodated within the thickness of the filter plate through contraction of the spring, and therefore, the filter cloth may be positively protected against abrasion without any inconvenience for the clamping of the filter plates, while the filter cloth can be caused to travel very smoothly.

Reference is further made to FIGS. 15 to 20 showing a further modification of the filter press FB of FIGS. 6 to 12. The modified filter FD of FIGS. 15 to 20 also has for its object to further prevent the abrasion of the filter cloth during separation of the filter residue therefrom, and is so arranged that the slit passage of the filter residue separating member for passing the filter cloth therethrough is also aligned with the downward travelling path of the filter cloth generally in the vertical direction so that no overload is applied to the filter cloth during travelling thereof for positively preventing abrasion of the filter cloth, while the filter residue adhering to the filter cloth may be positively separated.

In other words, in the modified filter press FD to be described hereinbelow, the filter residue separating member having the slit passage for passing the filter cloth therethrough is pivotally supported by a shaft provided at the upper portion of the filter cloth take-up roller journalled between the pair of support metal pieces, so that, upon opening or spacing of the filter plates, the filter residue separating member is pivoted by the filter cloth spread by urging force of the spring of the filter cloth take-up roller so as to align the slit passage with the downward travelling path of the filter cloth generally in the vertical direction, while, upon closing or clamping together of the filter plates, the filter residue separating member is again accommodated within the thickness of the filter plate.

In the modified filter press FD of FIGS. 15 to 20, the filter residue separating members 23D each formed by the outer plate 23D$a$ and the inner plate 23D$b$ to define a slit passage 32D therebetween are provided in pair at the upper portion of the support metal pieces 19 through support rollers 23D$r$.

The outer plate 23D$a$ is made of a thin plate of an approximately triangular cross section longer in length than the width of the filter cloth 16 and projecting out of the filter plates, and is formed, at its upper edge, with the residue separating edge 23D$c$.

Meanwhile, the inner plate 23D$b$ is formed by a thin plate having the length approximately equal to that of the outer plate 23D$a$, and has reduced thickness portions 23D$e$ formed at its opposite ends. Between the reduced thickness portions 23D$e$ and the corresponding end portions of the outer plate 23D$a$, thin plates P each having a thickness approximately equal to the thickness of the filter cloth 16 are respectively disposed so as to be fixed through brackets b, to a support roller 23D$r$ supported between the support metal pieces 19 for making it possible to cause the slit passage 32D having the width approximately equal to the thickness of the filter cloth 16 to be aligned with the downward travelling path of the filter cloth 16 generally in the vertical direction through pivotal movement of the support roller 23D$r$ for allowing only the filter cloth 16 to pass through said slit passage 32D.

Accordingly, the respective residue separating members 23D are pivotally supported by the support rollers 23D$r$, with the inner plates 23D$b$ thereof confronting each other between the support metal pieces 19 below the filter plates 5. Thus, as shown in FIG. 19, upon opening or spacing of the filter plates 5, the filter residue separating members 23D are respectively pivoted in the directions of arrows together with the support rollers 23D$r$ by the spring force of the torsion spring of the filter cloth take-up roller 20 so as to align the slit passages 32D of the filter cloth separating members 23D with the downward travelling path of the filter cloth 16 generally in the vertical direction for causing the filter cloth 26 to travel very smoothly without being damaged by the upper edge 23D$c$ of the outer plate 23D$a$ of the filter residue separating member 23D.

Therefore, in the downward running of each filter cloth 16, the edge portion 23D$c$ of the outer plate 23D$a$ of the filter residue separating member 23D, cuts between the filter cloth 16 and the filter residue 30 adhering to the filter cloth 16, and thus, the filter cloth 16 alone is caused to pass through said slit passage 32D, while the filter residue 30 is separated from the filter cloth 16 due to the wedge effect caused by the edge portion 23D$c$ so as to be dropped slantwise downwardly through guiding by the edge portion 23D$c$.

On the other hand, upon closing of the filter plates 5, the outer plates 23D$a$ are pushed against each other, and rotate the residue separating members 23D together with the support rollers 23D$r$ in directions opposite to those indicated by the arrows in FIG. 19, while causing the filter cloth 16 to be bent into the thickness of the filter plate 5, and thus, accommodate the respective residue separating members 23D into the thickness of the filter plates 5 as shown in FIG. 20 so as to provide no inconvenience for the clamping together of the filter plates 5.

Furthermore, in positions below the support roller 23D$r$ provided between the support metal pieces 19, there are further journalled the first and the second guide rollers G1 and G2 for guiding the filter cloths 16-1 and 16-2 before and after each of the filter plate 5, while at the back of the filter plate 5 in a position between the guide rollers G1 and G3, the water washing pipe 27D having a large number of nozzles 28D$a$ upwardly extending slantwise and rearwardly from said pipe 27D is provided for washing of the filter cloths 16.

It should be noted here that the arrangement described so far with reference to FIGS. 15 to 20 may further be modified in various ways within the scope of the invention. For example, in the modified filter press FD as described in the foregoing paragraphs, although the residue separating members 23D are provided above the support rollers 23D$r$, these separating members may be provided below said support rollers contrary to the manner illustrated.

Since other constructions and effects of the filter press FD as described so far are generally similar to those of the filter press FB or FC in FIGS. 6 to 14, detailed description thereof is abbreviated here for brevity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A filter press for separating raw liquid into a filtrate and a filter residue, which includes:
   a plurality of filter plates each having a pair of spaced support frames at the lower portion thereof,
   a pair of filter cloths disposed between each set of the neighboring filter plates, movably mounted between support stands for selective spacing therebetween or clamping together to each other,
   a winding up means arranged to be driven for forward or reverse rotation, cord members directed around said winding up means and respectively connected to upper edges of said filter cloths for selective lowering of said filter cloths into space between the respective neighboring filter plates or lifting said filter cloths therefrom, a filter cloth take-up roller journalled between the spaced support frames of each of said filter plates and engaged with the lower edges of said filter cloths which are to be wound thereonto and which hold each of said filter plates therebetween, said filter cloth take-up roller being provided therein with a torsion spring arranged to urge said filter cloth take-up roller in a direction to wind up said filter cloths thereonto, the improvement comprising:

a pair of filter residue separating members each having a slit passage for passing the filter cloths therethrough so as to separate the filter residue adhering to said filter cloths and each being provided between said spaced support frames of each of said filter plates, confronting members which define the slit passage between each of said filter residue separating members, and a spring member expansible and contractible in a direction back and forth with respect to the filter plate being disposed between said filter residue separating members in pair, whereby upon spacing of said filter plates, said slit passage is positioned along the downward travelling path of said filter cloth generally in a vertical direction, and upon clamping together to each other of said filter plates, said slit passage is accommodated within a thickness of said filter plate through contraction of said spring member.

2. A filter press for separating raw liquid into a filtrate and a filter residue, which includes:

a plurality of filter plates each having a pair of spaced support frames at the lower portion thereof, a pair of filter cloths disposed between each set of the neighboring filter plates, movably mounted between support stands for selective spacing therebetween or clamping together to each other, a winding up means arranged to be driven for forward or reverse rotation, cord members directed around said winding up means and respectively connected to upper edges of said filter cloths for selective lowering of said filter cloths into space between the respective neighboring filter plates or lifting said filter cloths therefrom, a filter cloth take-up roller journalled between the spaced support frames of each of said filter plates and engaged with the lower edges of said filter cloths which are to be wound thereonto and which hold each of said filter plates therebetween, said filter cloth take-up roller being provided therein with a torsion spring arranged to urge said filter cloth take-up roller in a direction to wind up said filter cloths thereonto, the improvement comprising:

a pair of filter residue separating members each having a slit passage for passing the filter cloths therethrough so as to separate the filter residue adhering to said filter cloths and each being provided between said spaced support frames of each of said filter plates, a support roller means, provided at a predetermined position with respect to the filter cloth take-up roller supported between the spaced support frames for each of the filter plates, for pivotally supporting each of the filter residue separating members, whereby, upon spacing of said filter plates, said filter residue separating members are pivoted by the filter cloths stretched by the urging force of the torsion spring of the filter cloth take-up roller so as to position said slit passages along the downward travelling path of the filter cloth generally in a vertical direction, and upon clamping together to each other of said filter plates, said filter residue separating members are again pivoted so as to be accommodated within the thickness of said filter plates.

* * * * *